(12) United States Patent
Decker et al.

(10) Patent No.: US 11,162,628 B2
(45) Date of Patent: Nov. 2, 2021

(54) METHOD AND DEVICE FOR THE RECONSTRUCTION OF A PIPE SECTION OF A PIPELINE SYSTEM

(71) Applicant: DCF Holding GmbH, Hamburg (DE)

(72) Inventors: Thomas Decker, Hamburg (DE); Torsten Henke, Hamburg (DE)

(73) Assignee: DCF HOLDING GMBH, Hamburg (DE)

( * ) Notice: Subject to any disclaimer, the term of this patent is extended or adjusted under 35 U.S.C. 154(b) by 0 days.

(21) Appl. No.: 16/547,947

(22) Filed: Aug. 22, 2019

(65) Prior Publication Data
US 2020/0103065 A1    Apr. 2, 2020

(30) Foreign Application Priority Data

Aug. 22, 2018 (DE) .................... 10 2018 120 513.9
Jan. 8, 2019 (DE) .......................... 102019100276.1

(51) Int. Cl.
| | | |
|---|---|---|
| *F16L 55/165* | (2006.01) | |
| *B29C 63/34* | (2006.01) | |
| *F16L 57/00* | (2006.01) | |
| *B29L 23/00* | (2006.01) | |

(52) U.S. Cl.
CPC .......... *F16L 55/1654* (2013.01); *B29C 63/34* (2013.01); *F16L 55/1656* (2013.01); *F16L 57/00* (2013.01); *B29L 2023/006* (2013.01)

(58) Field of Classification Search
CPC ... F16L 55/165; F16L 55/1653; F16L 55/265; F16L 55/1654; E03F 3/06
USPC ........................ 138/98, 97; 405/184.2, 150.1
See application file for complete search history.

(56) References Cited

U.S. PATENT DOCUMENTS

| | | | |
|---|---|---|---|
| 5,451,351 A | * | 9/1995 | Blackmore ......... F16L 55/1654 264/449 |
| 6,374,862 B1 | | 4/2002 | Schwert |
| 7,052,567 B1 | | 5/2006 | Blackmore et al. |
| 2004/0231789 A1 | | 11/2004 | Blackmore et al. |
| 2005/0092382 A1 | * | 5/2005 | Muhlin ..................... E03F 3/06 138/98 |
| 2006/0130923 A1 | * | 6/2006 | Lepola ................ F16L 55/1654 138/98 |

(Continued)

FOREIGN PATENT DOCUMENTS

FR         2542416 A1    9/1984

OTHER PUBLICATIONS

European Search report from corresponding European Application No. 19193145.0 dated Jan. 3, 2020.

*Primary Examiner* — Patrick F Brinson
(74) *Attorney, Agent, or Firm* — Porter Wright Morris & Arthur LLP

(57) ABSTRACT

In order to further improve a method and a device for rehabilitating a pipe section, wherein the rehabilitation device has at least one tube-shaped inliner for sealing damage to the pipe section and a heating element, in such a way that the rehabilitation may be carried out more easily, safer, and more economically, it is proposed to design the heating element as a tube-shaped and electric heating element and to arrange it essentially across an entire length of the inliner arranged within the pipe section, and to cure the inliner essentially along the entire length in one step by means of the tube-shaped electric heating element.

16 Claims, 6 Drawing Sheets

(56) References Cited

U.S. PATENT DOCUMENTS

| | | | |
|---|---|---|---|
| 2006/0151037 A1* | 7/2006 | Lepola | G21C 17/017 |
| | | | 138/98 |
| 2010/0122767 A1* | 5/2010 | Taylor | F16L 55/1651 |
| | | | 156/294 |
| 2016/0169437 A1 | 6/2016 | Schwert et al. | |
| 2017/0159869 A1 | 6/2017 | Parker | |
| 2017/0343147 A1* | 11/2017 | Meier | F16L 55/1654 |

* cited by examiner

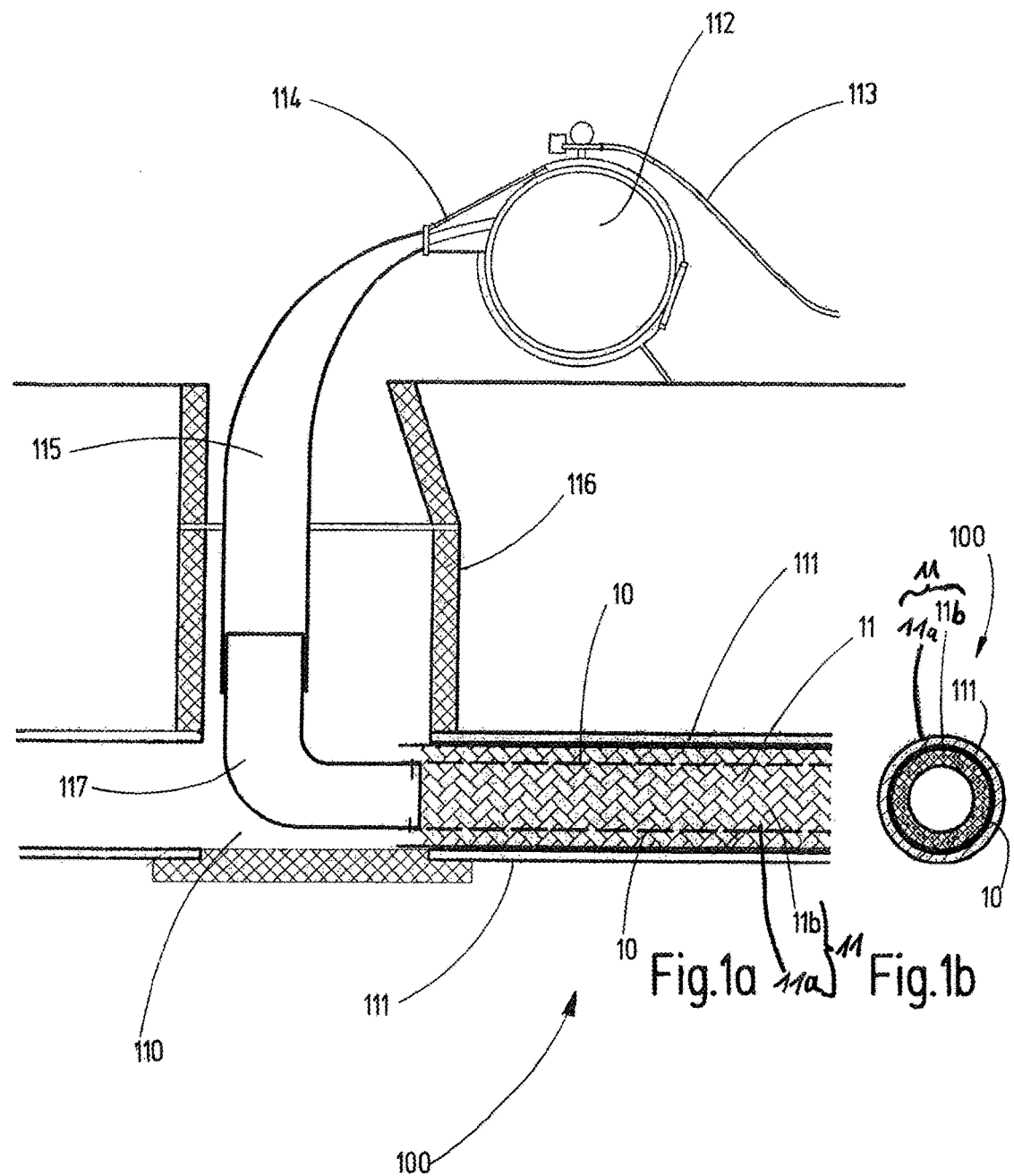

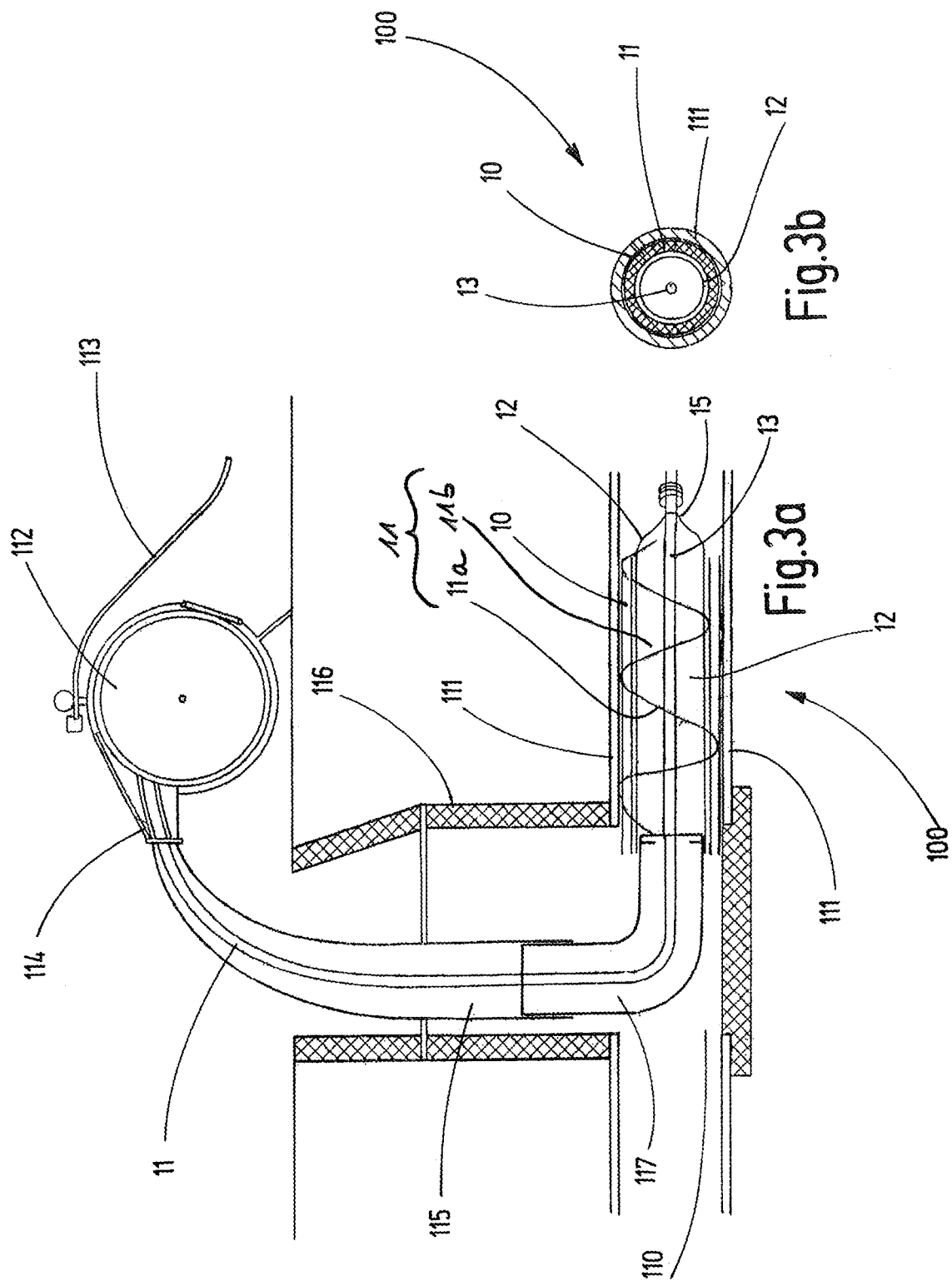

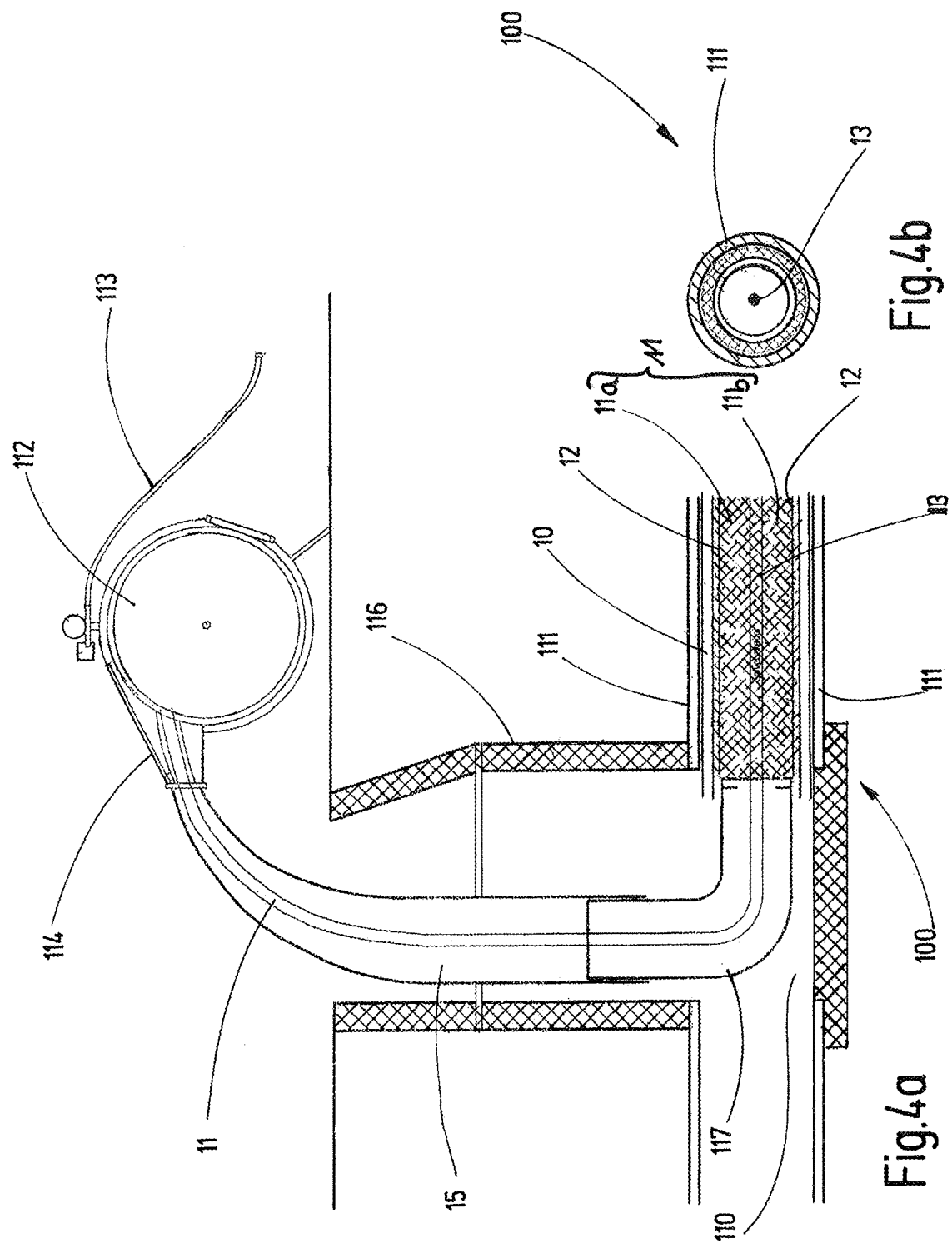

METHOD AND DEVICE FOR THE RECONSTRUCTION OF A PIPE SECTION OF A PIPELINE SYSTEM

TECHNICAL FIELD

The invention relates to a method and to a device for rehabilitating a pipe section of a pipeline system, wherein the rehabilitation device has at least one tube-shaped inliner for sealing damage to the pipe section and a heating element.

BACKGROUND INFORMATION

The use of a lining tube is known for lining, repairing, or sealing pipelines, for example, water and wastewater pipelines. For this purpose, coated tubes are introduced by reversing or inserting into the old pipe to be repaired, wherein an external coating of the tube is glued to the inner wall of the old pipe to be repaired or lined after the introduction. Such a tube is described, for example, in WO 00/25057 A1.

EP 2 722 157 A1 relates to a lining tube and a method for restoring a pressure pipe. The lining tube is designed as a composite tube with at least one first layer and a second layer contacting the first layer, wherein the first layer forms a substantially fluid-tight and/or gas-tight diffusion barrier, wherein the second layer is a textile fabric impregnated with resin and is designed for a full surface adhesive connection to an inner wall of the pipe to be rehabilitated.

DESCRIPTION OF THE INVENTION: OBJECT, SOLUTION, ADVANTAGES

It is the object of the present invention to further improve a method and a device for rehabilitating a pipe section, wherein the rehabilitation device has at least one tube-shaped inliner for sealing damage to the pipe section and a heating element, in such a way that the rehabilitation may be carried out more easily, safer, and more economically than using known methods or devices from the prior art.

According to the invention, a method is hereby provided for rehabilitating a pipe section of a pipeline system using a rehabilitation device, wherein the rehabilitation device has at least one tube-shaped inliner for sealing damage to the pipe section and a heating element. The method according to the invention thereby includes at least the following steps.

a) Inserting the rehabilitation device into the pipeline system, wherein the inliner and the heating element in the form of a tube-shaped heating element are positioned in the pipe section, and
b) Supplying compressed air, so that the tube-shaped inliner is applied to an inner wall of the pipe section, and
c) Activating the tube-shaped electric heating element for curing the inliner, by which means damage to the pipe section is sealed.

According to the invention, the tube-shaped electric heating element is arranged in step a) essentially across the entire length of the inliner arranged within the pipe section. Furthermore, in step c), the inliner is cured essentially along its entire length in a single step.

The pipeline system may be a system made of water pipes, for example, wastewater pipes. The pipe section is a part of the system and may be an entire pipe or also a part of a pipe. According to the invention, an inliner is understood to be a tube-shaped carrier material, in particular a tube liner or a synthetic fiber tube with resin. The inliner or synthetic fiber tube is impregnated with resin for this purpose. Prior to curing, the inliner is thus flexible and may be easily inserted into the pipeline system and positioned in the pipe section to be rehabilitated.

By supplying compressed air, the inliner inside of the pipe section is laid or pressed on the inner wall of the pipe section to be rehabilitated, so that at least the section to be rehabilitated is covered by the inliner. The inliner or the resin, with which the inliner is impregnated, is cured by means of the tube-shaped electric heating element of the rehabilitation device. After curing, the inliner is rigid and no longer flexible. The section of the pipe section to be rehabilitated is thus sealed by means of the cured inliner.

The tube-shaped electric heating element has a plurality of heating elements, e.g., heating coils, arranged one behind the other in the longitudinal direction of a tube carrier unit of the heating element. The tube-shaped electric heating element, together with the inliner, is introduced or positioned in the pipe section in step a). Afterwards, the inliner may be cured by activating the heating means in a single step and uniformly in each section along the length of the inliner. Thus, in contrast to the methods and devices known from the prior art, it is no longer necessary to introduce a heating medium (e.g. air or water) through the pipe section in a separate downstream step after inserting an inliner into the pipe section to be rehabilitated. In this type of method known in the prior art, it is essential to guide the heating medium through the pipe section in such a way that each region of the inliner is cured in the same way and with the same quality along its length. In the method according to the invention, it is, in contrast, unproblematic to maintain a constant pressure of the tube-shaped electric heating element against the inner wall of the pipe section to be rehabilitated or against the inliner. The heating intensity emitted by the heating element is essentially constant along the length.

On the basis of the method according to the invention, after the arrangement of the inliner and the supply of the compressed air, the entire inliner may be simultaneously and uniformly cured in a single step along its length in the pipe section to be rehabilitated.

It is preferably provided that the rehabilitation device additionally has a calibration tube, which is positioned in the pipe section in step a), together with the inliner and the tube-shaped electric heating element, wherein the inliner is arranged around the calibration tube. The calibration tube thereby functions for positioning or arranging and aligning the inliner in the pipe section. It is particularly advantageous to use a calibration tube in the case of a pipe section with an open end. The calibration tube is inserted in or drawn into the pipeline system together with the inliner and the tube-shaped electric heating element. After step a), the end of the calibration tube is sealed air-tight, for example, bonded together. In step b), the inliner is no longer directly inflated by means of compressed air, rather, it is the calibration tube, which presses or lays the inliner, arranged around the calibration tube, on the inner wall of the pipe section to be rehabilitated.

In another step d), the calibration tube may be preferably removed again, for example, pulled out of the pipe section.

Furthermore, it is preferably provided that the rehabilitation device is inserted into the pipe section to be rehabilitated by means of a sliding arrangement, for example, a rod, a cable, a tube, a pipe, or the like. It is thereby particularly preferred to insert the inliner, together with the tube-shaped electric heating element, into the pipe section by means of the sliding arrangement. If using a calibration tube, this is also inserted into the pipe section, together with the inliner and the tube-shaped electric heating element, by means of the sliding arrangement. After the curing of the inliner, the calibration tube may be also be pulled out again in another step d) by means of the sliding arrangement.

The sliding arrangement is fixed on a first end of the inliner in its interior preferably prior to step a). For example, the sliding arrangement may be glued, sewed or fastened in the interior of the inliner on its first end. The first end of the inliner is to be understood, according to the present invention, as the end which is inserted first into the pipe system or into the pipe section to be rehabilitated. If using a calibration tube, the sliding arrangement may instead be fixed in the interior of the calibration tube on its first end. In this case, the calibration tube may also be easily pulled back out again after the curing of the inliner by means of the sliding arrangement.

Furthermore, it is preferably provided that the tube-shaped electric heating element is fixed on a first end of the inliner in its interior prior to step a). The tube-shaped electric heating element is fixed on a first end of the inliner, or, if using a calibration tube, also at a first end of the calibration tube so that this, together with the inliner, or the optional calibration tube, may be inserted into the pipe section and positioned therein. For this purpose, the tube-shaped electric heating element may also be fixed on or onto the sliding arrangement or integrated into the sliding arrangement.

Furthermore, according to the invention, a rehabilitation device for rehabilitating a pipe section of a pipeline system is provided, wherein the rehabilitation device has at least one tube-shaped inliner for sealing damager to the pipe section and a heating element. According to the invention, the heating element is designed as a tube-shaped electric heating element. Furthermore, the heating element has a plurality of heating means, in particular heating coils, arranged on and/or in a tube carrier unit of the heating element.

The plurality of heating means is arranged along the entire length of the inliner introduced into the pipe section. Thus, analogous to the previously described method, the tube-shaped electric heating element is no longer has to be guided piecemeal through the pipe section, for example, drawn or slid after positioning the inliner and supplying compressed air. As the tube-shaped electric heating element with a plurality of heating elements is arranged or positioned essentially across the entire length of the inliner arranged in the pipe section, after supplying the compressed air, the inliner or the resin of the inliner may be uniformly cured in a single step along the entire length of the inliner arranged in the pipe section in an easy and precise way.

The tube-shaped electric heating element is preferably integrated into the inliner. Alternatively, the inliner may also be arranged circumferentially around the tube-shaped electric heating element.

The tube carrier unit might have or comprise a glass fabric, in particular a silicon glass fabric, and/or an aluminum glass fabric.

The tube-shaped electric heating element is preferably fixed on a first end of the inliner and/or a first end of a calibration tube of the rehabilitation device. The heating element is hereby fixed in the interior of the inliner and/or the interior of the calibration tube.

It is also preferably provided that the tube-shaped electric heating element is designed as flexible and/or invertible. For example, the heating element may be designed as a flexible tube or flexible tube carrier unit with a plurality of electric heating means arranged one behind the other thereon and/or therein. For this purpose, the heating means may be arranged on the tube carrier unit or integrated into the same. The heating means may be arranged, for example, spirally on and/or in the tube carrier unit. Alternatively or additionally, the heating means may be arranged in a net-like fashion on and/or in the tube carrier unit.

Furthermore, it is preferably provided that the tube-shaped electric heating element is integrated or incorporated in a material of a calibration tube of the rehabilitation device, and/or is arranged or applied on the calibration tube. The heating elements, together with the flexible tube carrier unit or also without the same, may be integrated into the calibration tube and/or applied on the same. In this embodiment, the heating means of the heating element are also preferably arranged distributed circumferentially and also in the longitudinal direction of the calibration tube. Since the calibration tube contacts the inliner directly after supplying the compressed air, the spacing between the heating means of the heating element and the resin of the inliner to be cured is also quite low, and is primarily constant in the circumferential direction and also in the longitudinal direction of the entire inliner.

For example, the tube-shaped electric heating element may be glued and/or welded to a material of the calibration tube of the rehabilitation device. The heating elements, together with the flexible tube carrier unit or also without the same, may be glued and/or welded to the calibration tube for this purpose. The tube-shaped electric heating element is preferably fixed on the calibration tube by means of an additional layer, in particular a silicon layer arranged around the calibration tube. The tube-shaped electric heating element is arranged between the calibration tube and the additional layer for this purpose.

The rehabilitation device preferably has a sliding arrangement, with which the inliner and/or a calibration tube of the rehabilitation device may be inserted into the pipe section and positioned therein. The sliding arrangement is arranged in the interior of the inliner and/or the calibration tube for this purpose, and may, for example, be fixed on the first end of the inliner and/or the calibration tube in the interior thereof. The sliding device may also be designed, for example, as a slider cable, slide rod, or sliding hose.

It is also preferably provided that the tube-shaped electric heating element is connected to the sliding arrangement and/or fixed on the sliding arrangement and/or integrated into the sliding arrangement.

The rehabilitation device is preferably designed for rehabilitating a connecting pipe of the pipeline system and has a calibration tube designed as a support bladder. The support bladder has a first section for arrangement in a main pipeline section of the connecting pipe and a second section for arrangement in the secondary pipeline section of the connecting pipe.

Furthermore, the tube-shaped inliner is preferably designed as a shortliner for rehabilitating a short pipe of the pipeline system. This is to be understood as a pipe with high static and/or chemical load capacity. By this means, pipe damage in the form of points may be easily rehabilitated for the long term. The shortliner preferably has a glass fiber laminate impregnated with resin.

The rehabilitation device is particularly preferably designed for rehabilitating the pipe section according to a previously described method.

BRIEF DESCRIPTION OF THE DRAWINGS

The invention is subsequently explained exemplarily by way of preferred embodiments.

As schematically shown in:

FIGS. 1a, 1b: a rehabilitation device for rehabilitating a pipe section;

FIGS. 3a, 3b: a rehabilitation device with calibration tube and sliding arrangement;

FIGS. 4a, 4b: a rehabilitation device with calibration tube and sliding arrangement;

DETAILED DESCRIPTION OF THE INVENTION

Figures 2A, 2B:
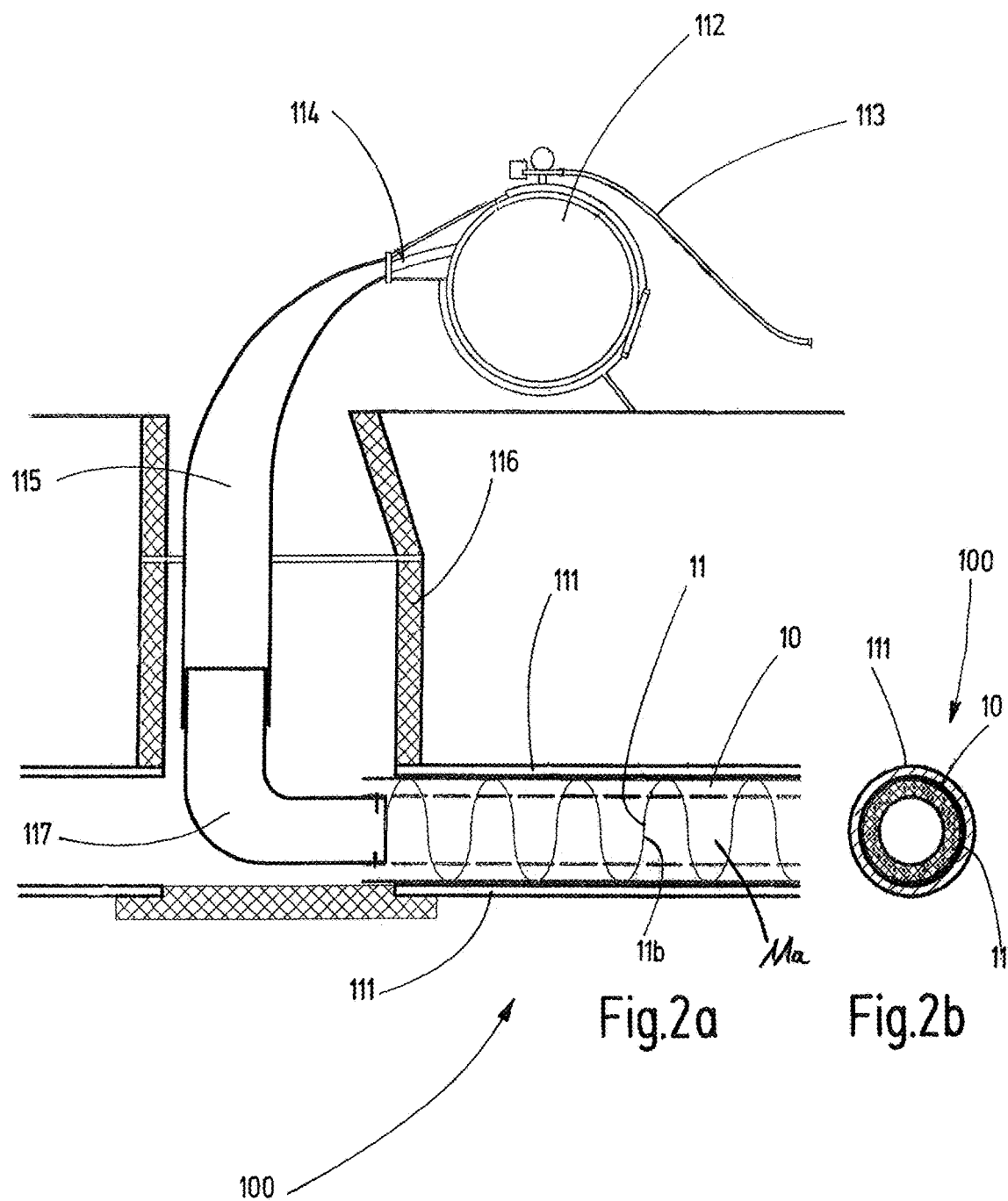
FIGS. 2a, 2b: another rehabilitation device for rehabilitating a pipe section.

FIGS. 1a and 1b show a rehabilitation device 100 for rehabilitating a pipe section 111 of a pipeline system 110, wherein pipe section 111 has a closed end (not shown in detail in FIGS. 1a and 1b).

By means of an inversion device 112, starting from the outlet pipe 114 of inversion device 112, a fabric tube 115, which also functions as a pressure tube, is inserted into inversion duct 116 and fitted on the inversion bracket 114. Rehabilitation device 100 was inserted into pipeline system 110 and positioned in pipe section 111 to be rehabilitated. In this embodiment, rehabilitation device 100 has a tube-shaped inliner 10, which is impregnated with resin, and a tube-shaped electric heating element 11 with a plurality of heating means 11b arranged one behind the other on a tube carrier unit 11a. At the first end 14 of inliner 10, tube-shaped electric heating element 11 is connected to inliner 10 in its interior. Furthermore, inliner 10 is closed at said first end 14.

After positioning rehabilitation device 100 in pipe section 111, compressed air is supplied via inversion device 112, so that tube-shaped inliner 10 is contacted or pressed onto the inner wall of pipe section 111 to be rehabilitated. Subsequently, tube-shaped electric heating element 11 is activated so that inliner 10 or the resin, with which inliner 10 is impregnated, cures and thus seals damage to pipe section 111.

Tube-shaped electric heating element 11 is hereby designed as flexible. In the example shown in FIG. 1a, heating means 11b are arranged in a net-like fashion on tube carrier unit 11a. Furthermore, tube-shaped electric heating element 11 is arranged in tube-shaped inliner 10 across its entire length so that the curing may be carried out in a single step and tube-shaped electric heating element 11 does not have to be pushed or pulled through.

A cross section through pipe section 111 to be rehabilitated with inserted rehabilitation device 100 is shown in FIG. 1b.

FIGS. 2a and 2b show another rehabilitation device 100 for rehabilitating a pipe section 111. In contrast to the example shown in FIGS. 1a and 1b, heating means 11b are arranged in a spiral on tube carrier unit 11a.

FIGS. 3a and 3b show a rehabilitation device 100 with calibration tube 12 and sliding arrangement 13. After inserting and positioning rehabilitation device 100 within pipe section 111, compressed air is supplied to calibration tube 12 via inversion device 112. Calibration tube 12 thus presses tube-shaped inliner 10 on the inner wall of pipe section 111 to be rehabilitated.

Similar to what is shown in FIGS. 1a, 1b, 2a, and 2b, tube-shaped electric heating element 11 is likewise designed to be flexible for this. In FIGS. 3a and 3b, heating means 11b are arranged in a spiral shape on tube carrier unit 11a, like in FIGS. 2a and 2b.

FIGS. 4a and 4b show another rehabilitation device 100 with calibration tube 12 and sliding arrangement 13. The design essentially corresponds to the example from FIGS. 3a and 3b. In contrast to this, however, heating means 11b are arranged in a net-like fashion on tube carrier unit 11a, as in FIGS. 1a and 1b.

Figure 5:
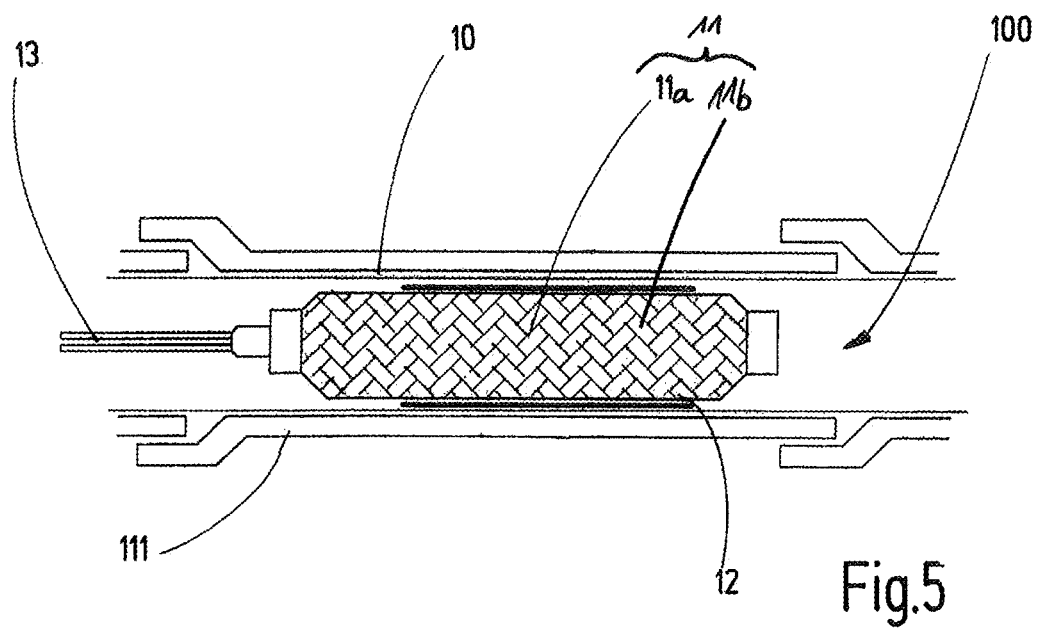
FIG. 5: a shortliner rehabilitation device with calibration tube and sliding arrangement.
Figure 6:
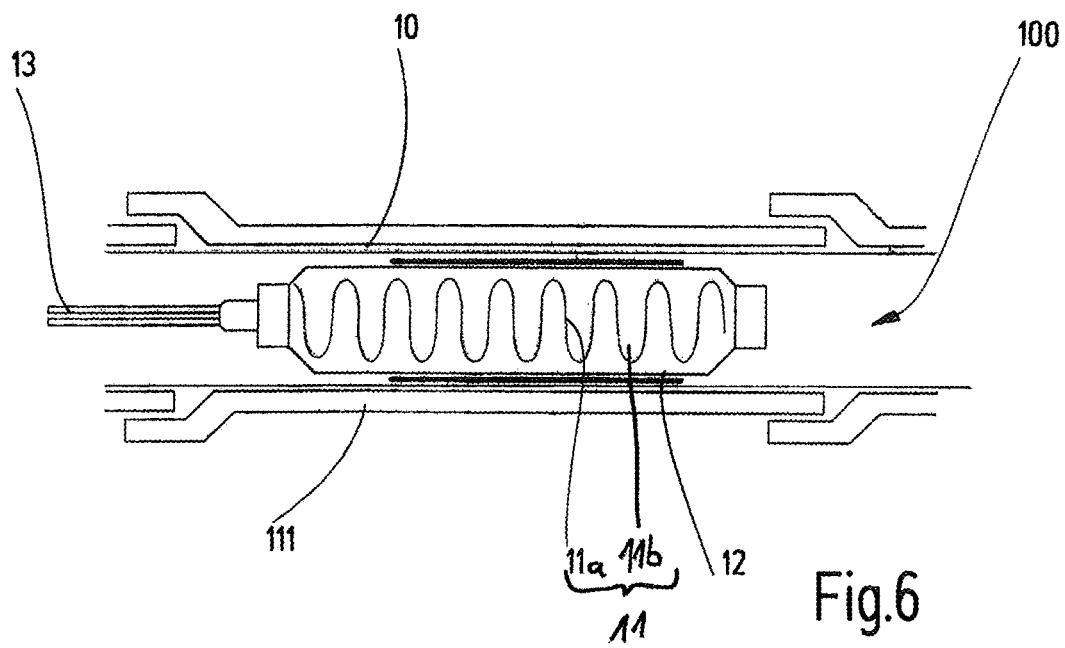
FIG. 6: another shortliner rehabilitation device with calibration tube and sliding arrangement.

FIGS. 5 and 6 show another variant of a rehabilitation device 100 with calibration tube 12 and sliding arrangement 13. In these examples, rehabilitation device 100 or its inliner 10 is designed as a shortliner for short pipes with high static and/or chemical load capacity. By this means, pipe damage in the form of points may be easily rehabilitated for the long term. Tube-shaped inliner 10 preferably has a glass fiber laminate impregnated with resin.

In FIG. 5, heating means 11b are arranged in a net-like fashion on tube carrier unit 11a, as in FIGS. 1a and 1b. In FIG. 6, heating means 11b are arranged in a spiral shape on tube carrier unit 11a, like in FIGS. 2a and 2b.

Figure 7:
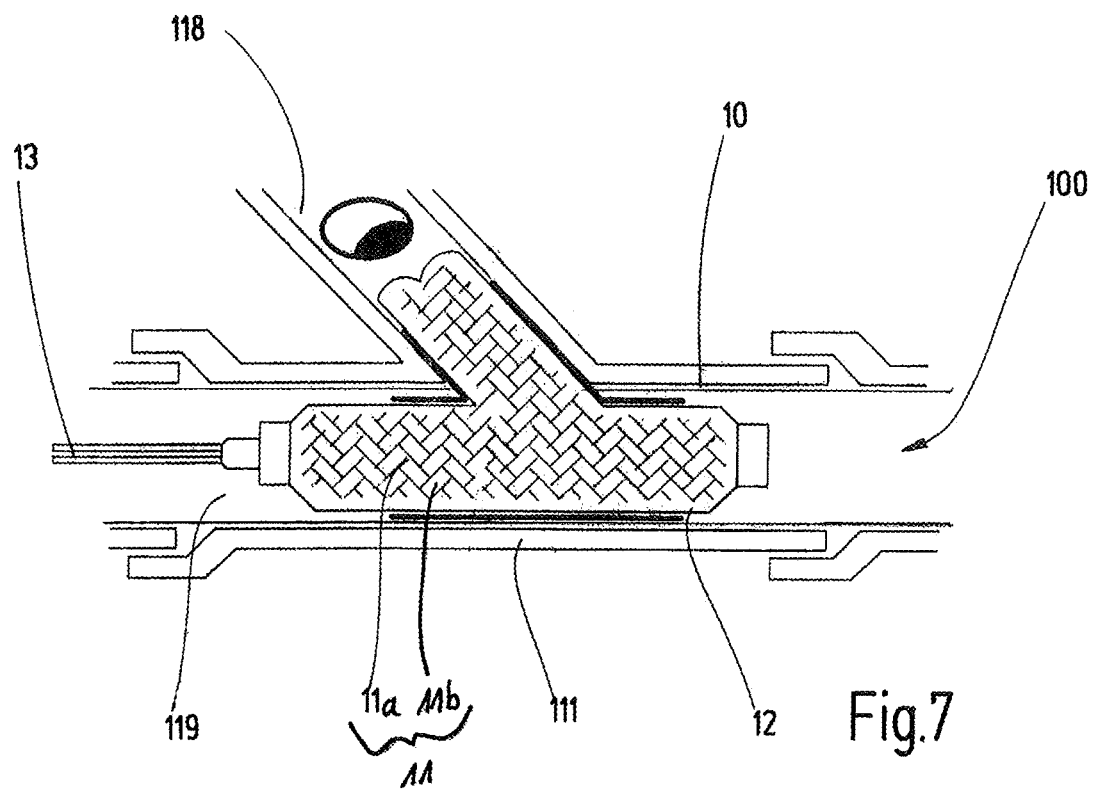
FIG. 7: a rehabilitation device with a calibration tube designed as a support bladder for rehabilitating a connecting pipe of a pipeline system.
Figure 8:
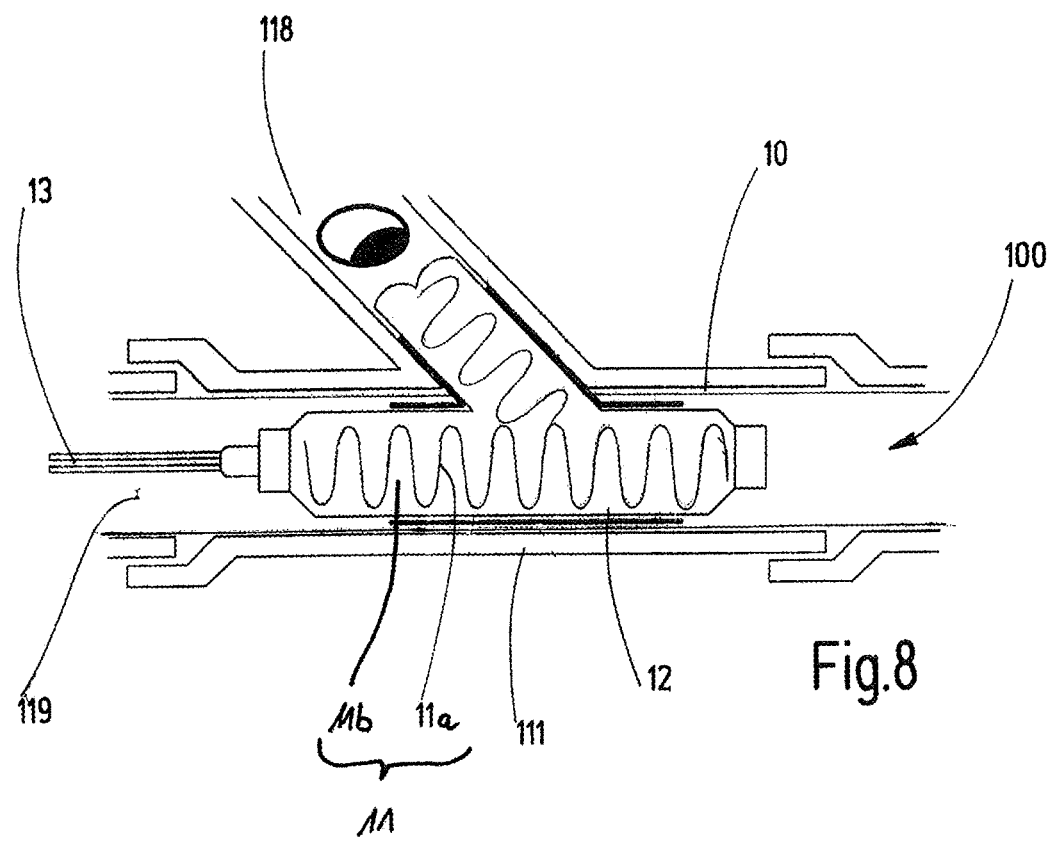
FIG. 8 another rehabilitation device with a calibration tube designed as a support bladder for rehabilitating a connecting pipe of a pipeline system.

FIGS. 7 and 8 show another variant of a rehabilitation device 100 with calibration tube 12 and sliding arrangement 13. The variant shown here functions for rehabilitating a connecting pipe of a pipeline system 110. Calibration tube 12 is designed for this as a support bladder with a first section for arrangement in a main pipeline section 119 of the connecting pipe and a second section for arrangement in a secondary pipeline section 118 of the connecting pipe. Prior to inserting the support bladder into pipeline system 110, the second section may be inverted. Upon subsequent positioning of the support bladder in the connecting pipe, the previously inverted second section unfolds into secondary pope section 118 of the connecting pipe due to the supply of compressed air.

In both variants, at least one tube-shaped electric heating element 11 is provided, wherein heating means 11b are arranged essentially over the entire length of the first and second sections of the support bladder. In FIG. 7, heating means 11b are arranged in a net-like fashion on tube carrier unit 11a, as in FIGS. 1a and 1b. In FIG. 8, heating means 11b are arranged in a spiral shape on tube carrier unit 11a, like in FIGS. 2a and 2b.

LIST OF REFERENCE NUMERALS

100 Rehabilitation device
10 Tube-shaped inliner
11 Tube-shaped electric heating element
11a Tube carrier unit
11b Heating means
12 Calibration tube
13 Sliding arrangement
14 First end of the inliner
15 First end of the calibration tube
110 Pipeline system
111 Pipe section
112 Inversion device 113 Compressed air hose
114 Outlet pipe
115 Textile hose
116 Inversion duct
117 Inversion bracket
118 Secondary pipe section
119 Main pipeline section

The invention claimed is:

1. Rehabilitation device for rehabilitating a pipe section of a pipeline system, wherein the rehabilitation device has at least one tube-shaped inliner for sealing damage to the pipe section, a heating element, and a calibration tube, wherein:
   the heating element is tube-shaped and comprises a plurality of electric heating means arranged essentially across an entire length of the inliner,
   the inliner is a synthetic fiber tube arranged around the calibration tube,
   the inliner is impregnated with a curable resin and the inliner is flexible prior to curing of the resin; and
   the tube-shaped electric heating element is fixed on a first end of the inliner.

2. Rehabilitation device according to claim 1, wherein
   the tube-shaped electric heating element is flexible and/or invertible.

3. Rehabilitation device according to claim 1, wherein
   the tube-shaped electric heating element further comprises a flexible tube carrier unit, wherein the electric heating means are arranged on the tube carrier unit and/or integrated into the tube carrier unit.

4. Rehabilitation device according to claim 1, wherein
   the tube-shaped electric heating element is integrated into a material of the calibration tube of the rehabilitation device and/or is arranged on the calibration tube.

5. Rehabilitation device according to claim 1, wherein
   the rehabilitation device has a sliding arrangement, with which the inliner and/or the calibration tube of the rehabilitation device may be inserted into the pipe section.

6. Rehabilitation device according to claim 5, wherein
   the tube-shaped electric heating element is connected to the sliding arrangement and/or is fixed on the sliding arrangement and/or is integrated into the sliding arrangement.

7. Rehabilitation device according to claim 1, wherein
   the rehabilitation device is adapted for rehabilitating a connecting pipe of the pipeline system and the calibration tube comprises a support bladder, wherein the support bladder has a first section for arrangement in a main pipeline section of the connecting pipe and a second section for arrangement in a secondary pipeline section of the connecting pipe.

8. Rehabilitation device according to claim 1, wherein
   the tube-shaped inliner is configured as a shortliner to rehabilitate a short pipe of the pipeline system and/or comprises a glass fiber laminate impregnated with resin.

9. A method for rehabilitating a pipe section of a pipeline system using the rehabilitation device according to claim 1, comprising the steps of:
   a) inserting the rehabilitation device into the pipeline system such that the inliner and the tube-shaped heating element are positioned in the pipe section,
   b) supplying compressed air to the rehabilitation device such that the tube-shaped inliner is applied to an inner wall of the pipe section, and
   c) activating the tube-shaped electric heating element in order to cure the resin of the inliner, thereby sealing damage to the pipe section,
   wherein
   the tube-shaped electric heating element is arranged in step a) essentially across an entire length of the inliner arranged within the pipe section and the inliner is cured in step c) essentially along its entire length in one step, and
   the tube-shaped electric heating element is fixed on a first end of the inliner, in the interior of the inliner, prior to step a).

10. The method according to claim 9, wherein the calibration tube is positioned in the pipe section in step a), together with the inliner and the tube-shaped electric heating element.

11. A method for rehabilitating a pipe section of a pipeline system using the rehabilitation device according to claim 2, comprising the steps of:
   a) inserting the rehabilitation device into the pipeline system such that the inliner and the tube-shaped heating element are positioned in the pipe section,
   b) supplying compressed air to the rehabilitation device such that the tube-shaped inliner is applied to an inner wall of the pipe section, and
   c) activating the tube-shaped electric heating element in order to cure the resin of the inliner, thereby sealing damage to the pipe section,
   wherein
   the tube-shaped electric heating element is arranged in step a) essentially across an entire length of the inliner arranged within the pipe section and the inliner is cured in step c) essentially along its entire length in one step, and
   the tube-shaped electric heating element is fixed on a first end of the inliner, in the interior of the inliner, prior to step a).

12. A method for rehabilitating a pipe section of a pipeline system using the rehabilitation device according to claim 3, comprising the steps of:
   a) inserting the rehabilitation device into the pipeline system such that the inliner and the tube-shaped heating element are positioned in the pipe section,
   b) supplying compressed air to the rehabilitation device such that the tube-shaped inliner is applied to an inner wall of the pipe section, and
   c) activating the tube-shaped electric heating element in order to cure the resin of the inliner, thereby sealing damage to the pipe section,
   wherein
   the tube-shaped electric heating element is arranged in step a) essentially across an entire length of the inliner arranged within the pipe section and the inliner is cured in step c) essentially along its entire length in one step, and
   the tube-shaped electric heating element is fixed on a first end of the inliner, in the interior of the inliner, prior to step a).

13. A method for rehabilitating a pipe section of a pipeline system using the rehabilitation device according to claim 4, comprising the steps of:
   a) inserting the rehabilitation device into the pipeline system such that the inliner and the tube-shaped heating element are positioned in the pipe section, b) supplying compressed air to the rehabilitation device such that the tube-shaped inliner is applied to an inner wall of the pipe section, and c) activating the tube-shaped electric heating element in order to cure the resin of the inliner, thereby sealing damage to the pipe section, wherein the tube-shaped electric heating element is arranged in step a) essentially across an entire length of the inliner arranged within the pipe section and the inliner is cured in step c) essentially along its entire length in one step, and the tube-shaped electric heating element is fixed on a first end of the inliner, in the interior of the inliner, prior to step a).

14. A method for rehabilitating a pipe section of a pipeline system using the rehabilitation device according to claim 5, comprising the steps of:

a) inserting the rehabilitation device into the pipeline system such that the inliner and the tube-shaped heating element are positioned in the pipe section, b) supplying compressed air to the rehabilitation device such that the tube-shaped inliner is applied to an inner wall of the pipe section, and c) activating the tube-shaped electric heating element in order to cure the resin of the inliner, thereby sealing damage to the pipe section, wherein the tube-shaped electric heating element is arranged in step a) essentially across an entire length of the inliner arranged within the pipe section and the inliner is cured in step c) essentially along its entire length in one step, the tube-shaped electric heating element is fixed on a first end of the inliner in the interior of the inliner prior to step a), and in step a), the rehabilitation device is inserted into the pipe section by means of the sliding arrangement.

15. The method according to claim 14, wherein the sliding arrangement is fixed on a first end of the inliner, in the interior of the inliner, prior to step a).

16. A method for rehabilitating a connecting pipe of a pipeline system using the rehabilitation device according to claim 7, comprising the steps of:

a) inserting the rehabilitation device into the pipeline system such that the inliner and the tube-shaped heating element are positioned in the connecting pipe, with the first section of the support bladder positioned within a main pipeline section of the connecting piper, and the second section of the support bladder positioned within a secondary pipeline section of the connecting pipe, b) supplying compressed air to the rehabilitation device such that the tube-shaped inliner is applied to an inner wall of the connecting pipe, and c) activating the tube-shaped electric heating element in order to cure the resin of the inliner, thereby sealing damage to the connecting pipe, wherein the tube-shaped electric heating element is arranged in step a) essentially across an entire length of the inliner arranged within the connecting pipe and the inliner is cured in step c) essentially along its entire length in one step, and the tube-shaped electric heating element is fixed on a first end of the inliner, in the interior of the inliner, prior to step a).

* * * * *